United States Patent [19]

Beschke et al.

[11] 3,920,657

[45] Nov. 18, 1975

[54] PROCESS FOR THE PRODUCTION OF 2-CHLOROPYRIDINE

[75] Inventors: Helmut Beschke, Grossauheim; Wilhelm Alfons Schuler, Bad Homburg, both of Germany

[73] Assignee: Deutsche Gold- und Silber-Scheideanstalt vormals Roessler, Germany

[22] Filed: Oct. 19, 1973

[21] Appl. No.: 408,050

[30] Foreign Application Priority Data

Oct. 24, 1972 Germany............................ 2252002

[52] U.S. Cl. .......................................... 260/290 HL
[51] Int. Cl.² ...................................... C07D 213/02
[58] Field of Search ..................................... 260/290

[56] References Cited

UNITED STATES PATENTS

| 2,820,791 | 1/1958 | Sherman | 260/290 |
| 2,839,534 | 6/1958 | Shrader et al. | 260/290 |

FOREIGN PATENTS OR APPLICATIONS

| 1,050,378 | 12/1966 | United Kingdom | 260/290 |

Primary Examiner—Harry I. Moatz
Attorney, Agent, or Firm—Cushman, Darby & Cushman

[57] ABSTRACT

2-chloropyridine is prepared from pyridine in the presence of steam at a temperature of 300° to 400°C. employing 0.4 to 0.5 mole of chlorine and 0.5 to 2 moles of steam per mole of pyridine.

14 Claims, 2 Drawing Figures

PROCESS FOR THE PRODUCTION OF 2-CHLOROPYRIDINE

The invention is directed to an improved process for the production of 2-chloropyridine.

It is known to produce 2-chloropyridine from pyridine in the vapor phase and 0.5 to 1.5 moles of chlorine per mole of pyridine in the presence of steam at temperatures above 260°C. This process is preferably carried out in the presence of silicon carbide (Shermer German Auslegeschrift 1,135,907 and U.S. Pat. No. 2,820,791). A disadvantage of this process is that a considerable amount of tarry byproducts are formed which considerably increase the difficulty of carrying out the process on a large scale, as is acknowledged by the owner of the Shermer Auslegeschrift in Auslegeschrift 1,470,143. Besides there occur special difficulties in the purification and working up of the waste gases by the presence of large amounts of chlorine which has a strong corrosive action.

For this reason Zaslowsky German Auslegeschrift 1,470,143 which, as stated, is owned by the owner of Auslegeschrift 1,135,907, produces 2-chloropyridine by reacting pyridine and chlorine in the presence of carbon tetrachloride and a molar proportion of pyridine to chlorine of 1:1 to 4:1 at temperatures between 300° and 420°C. However, this process also has the disadvantage that not all of the chlorine is reacted and again chlorine containing waste gases must be removed. Furthermore, the carbon tetrachloride needed in this process is included in the German Federal Register for 1971 of dangerous materials which can only be used if they cannot be replaced for industrial reasons by less dangerous materials.

Finally, there is known another process that tries to get around the deficiencies of the known processes by carrying out the chlorination of pyridine under the effect of light (U.S. Pat. No. 3,297,556). However, there is also required in carrying out this process industrially halogenated hydrocarbons, preferably carbon tetrachloride, are required. As a further disadvantage the yields are unsatisfactory.

There has now been found a process for the production of 2-chloropyridine by reacting pyridine with chlorine in the presence of steam at a temperature above 260°C, specifically at a temperature between 300° and 400°C. employing per mole of pyridine 0.4 to 0.5 mole of chlorine and 0.5 to 2 moles of steam. As shown in the examples there is preferably employed chlorine in an amount of not over 0.48 mole of chlorine per mole of pyridine (Example 1). Even better yields are obtained at 0.46 mole of chlorine as shown in Example 2.

The advantages of the process of the invention are as follows:

1. No organic solvent is used.
2. The total amount of chlorine added is reacted quantitatively. Thereby there is eliminated chlorine containing waste gases or wash water. In general the amount of waste gases, waste waters and waste materials is reduced to a minimum.
3. The use of catalysts is not necessary.
4. Clogging by carbon or resinification products does not occur. Therefore, the process of the invention is especially suited for a continuous operation.

The process of the invention can, for example, be carried out as follows:

A pyridine-water mixture which contains 0.5 to 2 moles of water per mole of pyridine is vaporized, preheated to a temperature between 200° and 350°C., preferably 250° to 330°C. (the lower temperatures are especially suitable for mixtures which contain the lower amounts of water) and introduced into the reaction vessel. However, it is also possible to separately preheat pyridine vapor and steam, subsequently mix them and then introduce them into the reaction vessel. In this method the pyridine vapor likewise suitably is heated to a temperature between 200° and 350°C., the steam to 100° to 330°C., preferably 100° to 250°C. Besides a chlorine gas, steam in an amount of 0.4 to 0.5 mole of chlorine, preferably not over 0.48 mole, per mole of pyridine is preheated at a temperature likewise between 200° and 350°C., preferably 250° to 330°C. Both gas streams were united in the upper part of the reaction vessel under thorough mixing. Thereby at the place of mixing there is established a temperature of 290° to 350°C., preferably 300° to 340°C. The thorough mixing, for example, can be accomplished by joining two constricted gas tubes or by a binary nozzle. The reaction vessel is held at a temperature of 300° to 400°C., preferably 330° to 360°C. (for example oil or salt bath heating). As the reaction vessel, there is used, for example, a tube made of pure nickel. The gas mixture leaving the reaction vessel is then cooled (for example while it is led through a condenser and/or is brought in contact with an aqueous spray). Preferably, the cooling is to about 20° to 60°C. Then in a cooled neutralization vessel at a temperature of +5° to +20°C., the pH is adjusted to 8 to 11, preferably 9 to 10, for example with alkali lye (for example soda lye) or alkali carbonate solution (e.g. sodium carbonate). In a given case there is added so much water thereby that the inorganic salts remain in solution. This neutralization can be automatically regulated in industry. Simultaneously, a remaining gas stream is led by way of a vacuum line over a wash tower through which the diluted soda lye is repumped. The neutralized reaction solution is transferred into a supply vessel and there separated into two phases. The upper phase is salted out with about 2 to 10% of its weight with stirring with an inorganic salt whereby it forms a lower, salt containing aqueous phase which is combined with the previous lower phase.

The material used to salt out the organic material should simultaneously have as high as possible solubility in water as well as effect a water removal from the organic phase (drying effect). Especially soluble is potassium carbonate. There can also be used in general hydroxides and salts (such as carbonates, sulfates and halides) of the alkali metals, especially potassium or sodium. These compounds include, for example, sodium hydroxide, potassium hydroxide, sodium carbonate, sodium sulfate, potassium sulfate, sodium chloride, potassium chloride, sodium bromide and potassium bromide.

The combined aqueous is subsequently subjected to distillation. The distillation is continued only as long as pyridine can be detected in the distillate. Small amounts of higher chlorinated pyridine also pass over so that the remaining salt solution is substantially free of organic constituents. In general, it is sufficient to distill off about 10 to 20% of the entire phase to produce this effect. Then the distillate is combined with the organic phase and subjected to a fractionation at 100 Torr. There is obtained first in the range of 48° to 50°C.

a distillate which consists of a mixture of pyridine and water. Subsequently in the range of 50° to 85°C. there passes over essentially pyridine with a little water. Then there follows between 85° and 101°C. a small intermediate run with a 3-chloropyridine constituent. In the range of 101° to 105°C. the 2-chloropyridine boils. It is obtained in a purity of over 99%.

Then, in a given case purified pyridine-water mixture of both first fractions after corresponding addition of further pyridine and installation of the desired molar proportions of pyridine and water can again be inserted for further synthesis.

The distillation of the organic phase, which is recovered by salting out, naturally can also be carried out independent of the distillate of the salt solution. This is merely a question of arrangement of the apparatus. Likewise, it is possible to employ other customary methods of working up the reaction mixture.

According to the process of the invention, the reaction of the pyridine is between 40 and 45% of that added, the reaction of the chlorine is quantitative, and the reaction yield to 2-chloropyridine is over 85%.

The reaction vessel is made of a material which is inert under the reaction conditions. Especially suitable are nickel as well as alloys of nickel, chromium and iron, alloys of nickel, molybdenum and iron, alloys of nickel, molybdenum, chromium and iron, Duran-nickel (alloy of nickel and aluminum) as well as "cast-nickel" (alloy of nickel and silicon). The reaction vessel can be of any shape, preferably it is cylindrical. It is important that there be a specified ratio of surface area to contents of the reaction vessel. Generally this ratio is between 0.1 to 8:1. The range between 0.2 to 4:1, especially 0.4 to 2:1 is especially favorable. The contents of the reaction vessel, for example, can be 0.5 to 10 liters.

The residence time in the reaction vessel is generally 0.5 to 1.5 seconds. The speed of flow of the gases is generally between 0.5 and 3 meters per second in the reaction vessel. The speed of flow of the gases before entrance into the reaction vessel is generally higher. The lower limit, for example, is 5 meters per second. The upper limit, for example, is 300 meters per second.

The thorough mixing of the reaction components, inclusive of the steam, should take place as quickly as possible directly after the entrance into the reaction vessel. The entrance openings therefore are so arranged that a quick and thorough mixing is guaranteed. This is possible, for example, by introducing the components (chlorine and pyridine-water mixture) into the reaction vessel through two tubes which are arranged at an angle. This angle, for example, can be a right angle. However, it is also possible to use several lines to introduce each of the reaction components or only one of the components and to arrange these at such angles and distances in the reaction vessel that a powerful turbulance and an optimally quick mixing occurs. It should be understood of course that it is also possible to use nozzles in place of simple tubes. Separate nozzles can be used for each of the components. Likewise, it is possible to introduce, for example, the chlorine and the pyridine-water mixture into the reaction vessel through a binary nozzle. If no nozzles are used, it is important that a component entering the reaction vessel have an increased velocity at its entrance. This velocity can lie between 5 meters per second and 300 meters per second.

In the heating of the reaction components one can proceed in such a manner that the pyridine is heated separately from water and chlorine, i.e. all three materials, pyridine, chlorine and steam, are heated separately and then mixed in the reaction space. The temperature to which the three components always are preheated, for example, can be between 200° and 350°C. and can be the same or different for each component. It must merely be observed that not all three components simultaneously have a temperature of 350°C. or higher at the entrance into the reaction space, since then the temperature becomes too high in the reaction space. However, for example, at times two components can be heated to the reaction temperature, as for example 350°C. providing the temperature of the third component is correspondingly lower. Thereby it is possible to regulate the temperature in the reaction space by the temperature of the third component (for example steam or pyridine vapor or chlorine) in which the temperature of this component is always so regulated (in general below 350°C., for example between 100° and 330°C.) that there is always maintained in the reaction space a fixed, constant temperature or temperature zone.

Limited by the recovery of aqueous pyridine, however, it is generally simpler to add a pyridine-water mixture, since then the recovered aqueous pyridine can be again directly added into the circuit after previously establishing the correct mixing proportion, again by the addition of pyridine or water. Above all, it is important that the mixing of the chlorine and pyridine take place first in the reaction vessel.

The capacity of the process of the invention proceeds from the liter efficiency. This can be characterized by the yield of 2-chloropyridine per liter of reactor per hour. It generally is between 0.5 to 3 kg, preferably 0.75 to 2 kg. The liter capacity is dependent at one time on the ratio of surface area to the content of the reaction, at another time on the amount of steam to be fed. The lower value of 0.5 kg is valid, for example, for a small ratio of reactor surface area to reactor contents, while the value of 3 kg is valid for a large ratio of reactor surface area to reactor content. A liter capacity of 2 kg, for example, is possible at a ratio of reactor surface area to reactor content equal to 2:1, a liter capacity of 1 kg, for example, is possible at a ratio of reactor surface area to reactor content of 2.5:6. Generally at large ratios of surface area to contents less (or little) steam is used; at a small ratio of surface area to contents more steam must be added.

The liter capacity can also be based on the kilograms of pyridine added per liter of reactor volume whereby the capacity now is generally between 0.5 to 6 kg of pyridine. Especially favorable is the range from 1 to 4, especially 1.3 to 3.5 kg pyridine per liter of reactor volume per hour.

It is especially advantageous to cool the reaction product by using an aqueous spray. The amount of water metered for this purpose can be suitably so calculated that in the connected neutralization (for example with industrial soda lye, approximately 50%) the salt formed (NaCl) just remains in solution. It is likewise possible to provide an additional cooling from the outside or through internal coolers.

In a preferred form the heating of the reaction vessel is so regulated by temperature detecting element that there is always automatically present an average temperature between 330° and 360°C. in the reaction vessel. In case the temperature goes above this the optimum reaction temperature can again be produced, moreover, by removal of the heating bath and sweeping the reaction vessel with an air stream of correspondingly lower temperature, for example an air temperature up to about 200°C.

Another example consists of heating the reaction vessel by different, for example 2 or 3, separate types of heating so that, for example, the last part of the reaction vessel (since the highest temperatures occur here) can be better held below the 400°C. limit (for example by electrical heating, etc.).

The invention will be understood best in connection with the drawings wherein.

Figure 1:
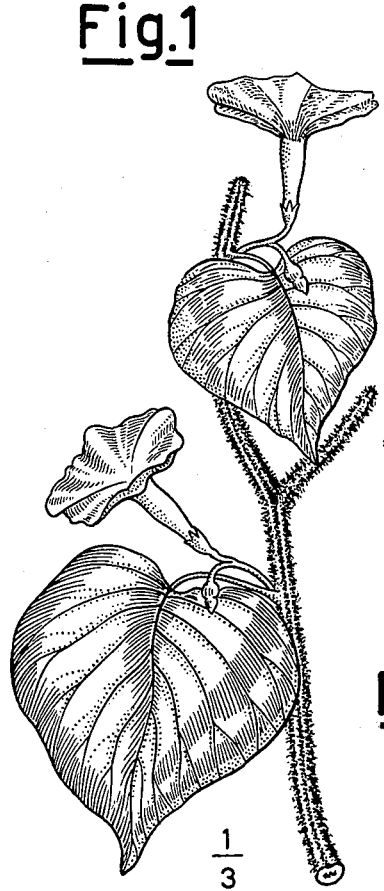
FIG. 1 is an enlarged view of the upper part of the apparatus.
Figure 2:
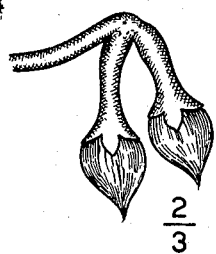
FIG. 2 is a view of the entire apparatus.
Figures 3, 4:
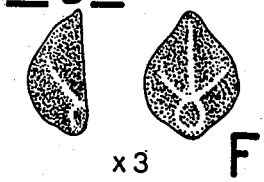

Referring more specifically to the drawings, the process of the invention can be carried out in the apparatus of FIG. 2. The upper part of the figure consists of the reaction vessel 3 (shown in enlarged form in FIG. 1) which contains a thermocouple protective case 4 (diameter for example 6mm) and is surrounded by heating jacket 5. On one end of the reaction vessel there are located, for example, two openings for tubes 1 and 12 with nozzles 2 and 22 through which the reaction components are introduced. For example, a pyridine-water mixture is introduced through tube 1 and chlorine gas is introduced through tube 12. The tubes 1 and 12 are always surrounded by heating jackets 24 and 26.

The reaction vessel 3 then passes over to the cooling vessel 6, which contains the cooling jacket 8 as well as the internal cooler 9. In the upper part of the cooling vessel 6 there is located the sprinkler 7 for introduction of cold water. The liquid reaction product is drawn off through opening 11. Above 11 there is located a second opening 10 through which the gases eventually evolved can escape.

Unless otherwise indicated, all parts and percentages are by weight.

EXAMPLE 1

There were metered by way of a pump into an evaporator 1785 ml per hour of a pyridine-water solution having the molar ratio 1:0,75, the mixture evaporated and brought to a temperature of about 270°C. This corresponds to a throughput of 19.25 moles of pyridine per hour plus 14.5 moles of water per hour.

Simultaneously 656 grams of chlorine (9.25 moles) were led over a rotameter into a heater and likewise heated to about 270°C. Both heated gases were led together into the upper end of a nickel tube through two tubes, each constricted to 2 mm diameter. The speed of flow at the outlet of the inlet tubes (directly before the mixing place in the mixing head) was 36 meters per second for the chlorine gas and 133 meters per second for the pyridine-water mixture. The amounts introduced per unit of time are: pyridine 19.25 moles = 1.52 kilograms per hour; water 14.5 moles = 0.265 kilograms per hour; chlorine 9.25 moles = 656 grams per hour. The mixing ratios of the components accordingly are pyridine:water:chlorine = 1:0.75:0.48. The nickel tube had a diameter of 25 mm, a length of 900 mm and was held at 350°C. by a heat exchanger oil. There were distributed 4 thermocouples along the entire length of the tube, which in the direction of the gas flow indicated the following temperatures: 308°, 327°, 355°, 390°C. The residence time of the gas mixture was calculated to be about 0.7 seconds. There was installed at the lower end of the reaction tube a cooler with a spraying device through which there was pumped 1.2 liters of water per hour into the cooled reaction mixture. Below the cooler there was located a neutralization vessel that was cooled by a cooling brine. In the neutralization vessel containing the two phased reaction mixtures there were metered about 600 ml (= 840 grams) of 50% soda lye. The neutralization temperature was 15°C. A pH of 9.5 was established. The neutralization vessel had a waste gas line through which chlorine gas, which eventually broke through, was led into a recycled soda lye wash. In the more uniform carrying out of the reaction, no active chlorine was detected in the washings. Simultaneously, the liquid neutralization mixture was metered through a pump into a storage vessel so that the liquid level in the neutralization vessel could remain constant. In the storage vessel two liquid phases separated, they were separated. After several hours of reaction time there were accumulated 4470 grams of liquid which separated into 1920 grams of upper phase and 2550 grams of lower phase. There were added 125 grams of potash to the upper phase, it was stirred and allowed to settle. There were obtained 1220 grams of an upper organic phase and 825 grams of a lower aqueous potash phase. Both aqueous layers were combined and evaporated by distillation at normal pressure whereupon, after distillation of about 700 grams, no more pyridine could be detected in the distillation residue.

The distillate was then combined with the separated organic phase, altogether there was obtained 1900 grams and this was distilled in a fractionating column. The following fractions were obtained:

| 1. $B_1P_{100}$ | 48 to 50°C. | 848 grams of distillate consisting of 727 grams of pyridine and 121 grams of water |
| --- | --- | --- |
| 2. $B_1P_{100}$ | 50 to 85°C. | 162 grams of distillate consisting of 153 grams of pyridine and 9 grams of water |
| 3. $B_1P_{100}$ | 85 to 101°C. | 38 grams of an intermediate product with 3-chloropyridine |
| 4. $B_1P_{100}$ | 101 to 105°C. | 796 grams of 2-chloropyridine, gas chromatographic purity>99% |
| 5. Residue | | 56 grams of higher chlorinated products |

Accordingly, there was reacted 42.2% of the pyridine added. There was obtained 2-chloropyridine in a reaction yield of 86.4%.

EXAMPLE 2

A pyridine-water mixture having the molar ratio of 1:1.5 was metered into a heater so that there were evaporated hourly 117.0 moles of pyridine and 175.5 moles of water and the vaporized product heated to 318°C. Simultaneously, there was heated to 278°C. in a second heater 54.0 moles of chlorine. A nickel reactor, diameter 80 mm and length 1000 mm, was provided in its upper end with a closure head which contained two gas inlet tubes, each having a diameter of 7 mm through which the two gas streams were introduced. The speed of flow at the outlet before the mixing was 0 for the chlorine gas 18 meters per second, for the pyridine-water mixture 102 meters per second. The amounts supplied per unit of time were: pyridine:117.0 moles = 9.25 kilogram per hour; water:175.5 moles = 3.16 kilograms per hour; chlorine:54.0 moles = 3.83 kilograms per hour. An oil heater was used to heat the reaction tube to 340°C. and while the reaction occurred in the reactor tube, the following temperatures were measured at 6 places uniformly distributed in the tube, 329°, 336°, 349°, 358°, 369° and 200°C (this last place of measurement already is located in the portion of the tube which no longer is surrounded by the heating jacket). The residence time is 1.2 seconds.

The reaction mixture was cooled in a quencher installed below the reactor-tube and diluted with 7.5 liters of water per hour. About 4.5 liters per hour of 50% soda lye at 20°C. were metered at such a rate into a neutralization vessel connected thereto that a pH of 9.5 was established. The mixture was continuously pumped from the neutralization vessel into a storage vessel. After 1 hour of reaction time there was obtained in the storage vessel 30.2 kg of product mixture which separated into 17.2 kg of an upper phase and 13.0 kg of a lower phase. After separation of the lower layer, the upper layer was treated with 860 grams of potash and stirred, whereupon again a layer separation took place. The lower aqueous potash layer was drawn off. It was 7.0 kg.

Both aqueous layers were concentrated to such an extent in a distillation apparatus that about 2.0 liters of distillate resulted. The distillate was combined with the organic phase and distilled in a fractionating apparatus. The following fractions resulted:

| | | |
|---|---|---|
| 1. $B_1P_{100}$ | 48 to 50°C. | 5.94 kg distillate containing 4.30 kg pyridine and 1.64 kg water |
| 2. $B_1P_{100}$ | 50 to 85°C. | 1.25 kg distillate containing 990 grams pyridine and 30 grams water |
| 3. $B_1P_{100}$ | 85 to 101°C. | 0.22 kg intermediate product containing 3-chloropyridine |
| 4. $B_1P_{100}$ | 101 to 105°C. | 5.42 kg 2-chloropyridine, gas chromatographic purity >99% 170 grams |
| 5. Residue | | |

EXAMPLE 3

For comparison, there was tried an experiment like Example 1 with the difference that in place of 656 grams of chlorine (9.25 moles), there were metered 1030 grams of chlorine (14.5 moles). The mixing ratio of the components accordingly was pyridine:water:chlorine = 1:0.75:0.75. After a few minutes reaction time, the temperature in the reaction tube rose above 450°C., it formed deposits which clogged the reaction tube and the cooler, and led to a rise in pressure. Therefore the experiment had to be broken off.

We claim:

1. A process for the production of 2-chloropyridine from pyridine and chlorine in the presence of steam comprising carrying out the reaction in a reactor comprising nickel with 0.4 to 0.48 mole of chlorine and 0.5 to 2 moles of steam for each mole of pyridine at a temperature between 300° and 400°C., the amount of pyridine employed being 1 to 4 kg per liter of reactor volume per hour.

2. A process according to claim 1 wherein there are used 0.46 to 0.48 mole of chlorine per mole of pyridine.

3. A process according to claim 1 wherein the gases just prior to entering the reaction vessel have a velocity between 5 and 300 meters per second and this is reduced in the reaction vessel to a velocity of 0.5 to 3 meters per second.

4. A process according to claim 1 wherein the ratio of surface area to contents is greater than 1:1 and there are used 0.5 to 1.5 moles of steam per mole of pyridine.

5. A process according to claim 1 wherein the ratio of surface area to contents is between 1:1 and 4:1.

6. A process according to claim 1 wherein the ratio of surface area to contents is less than 1:1 and there are used 1 to 2 moles of steam per mole of pyridine.

7. A process according to claim 6 wherein the ratio of surface area to contents is between 0.2:1 to 1:1.

8. A process according to claim 1 including the step of recovering the 2-chloropyridine formed without using an organic solvent, said recovery steps including (1) treating the reaction product with water, and adding an alkaline material in an amount sufficient to neutralize the reaction product and to form a salt to salt out the 2-chloropyridine from the water and form an organic phase and then distilling the organic phase to recover the 2-chloropyridine.

9. A process according to claim 1, wherein the amount of pyridine is 1.3 to 3.5 kg per liter of reactor volume per hour.

10. A process according to claim 1 wherein the reactor has a ratio of surface area to contents between 0.1:1 to 8:1.

11. A process according to claim 1 consisting of carrying out the reaction with said chlorine, pyridine and steam as the sole materials in the reactor.

12. A process according to claim 1 wherein the reactor is made of nickel or an alloy of nickel.

13. A process according to claim 12 wherein the reactor is made of nickel.

14. A process according to claim 12 wherein the reactor is made of (a) an alloy of nickel, chromium and iron, (b) an alloy of nickel, molybdenum and iron, (c) an alloy of nickel, molybdenum, chromium and iron, (d) an alloy of nickel and aluminum or (3) an alloy of nickel and silicon.

\* \* \* \* \*